United States Patent
Zhang et al.

(10) Patent No.: US 11,470,573 B2
(45) Date of Patent: Oct. 11, 2022

(54) METHOD AND DEVICE FOR POSITIONING IN WIRELESS COMMUNICATION

(71) Applicants: Xiaobo Zhang, Shanghai (CN); Lin Yang, Shanghai (CN)

(72) Inventors: Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 131 days.

(21) Appl. No.: 17/019,380

(22) Filed: Sep. 14, 2020

(65) Prior Publication Data

US 2020/0413366 A1   Dec. 31, 2020

Related U.S. Application Data

(63) Continuation of application No. PCT/CN2018/087951, filed on May 23, 2018.

(51) Int. Cl.
*H04W 64/00* (2009.01)
*H04W 76/11* (2018.01)
*G01S 5/02* (2010.01)

(52) U.S. Cl.
CPC ......... *H04W 64/003* (2013.01); *G01S 5/0236* (2013.01); *G01S 5/0284* (2013.01); *H04W 76/11* (2018.02)

(58) Field of Classification Search
CPC ... H04W 64/003; H04W 76/11; H04W 16/28; H04W 64/006; H04W 24/10;
(Continued)

(56) References Cited

U.S. PATENT DOCUMENTS

2010/0064193 A1* 3/2010 Huschke ............... H04L 1/1867
455/73
2011/0144905 A1* 6/2011 Tahara ..................... H04W 4/02
455/456.1
(Continued)

FOREIGN PATENT DOCUMENTS

CN   108024371 A   11/2016
CN   107528616 A   12/2017
(Continued)

OTHER PUBLICATIONS

First Office Action received in application No. CN201880090944.9 dated Sep. 14, 2021.
(Continued)

*Primary Examiner* — Kiet Tang

(57) ABSTRACT

The disclosure provides a method and a device for positioning in wireless communication. A first node transmits Q1 first-type radio signal(s) and transmits first information; wherein the Q1 first-type radio signal(s) is(are) transmitted by Q1 spatial parameter group(s) respectively; the first information includes a first Identifier (ID) and Q1 piece(s) of channel information, and the first information is used for indicating Q1 geographic position(s); the Q1 piece(s) of channel information is(are) based on a channel measurement(s) performed by a target node for the Q1 spatial parameter group(s) respectively, and the target node is identified by the first ID; and the Q1 spatial parameter group(s) cover(s) the Q1 geographic position(s) respectively. The disclosure can improve the precision of positioning and meanwhile keep a good compatibility with existing systems.

20 Claims, 13 Drawing Sheets

(58) Field of Classification Search
 CPC ............... G01S 5/0236; G01S 5/0284; G01S 2205/008; G01S 1/08; G01S 5/02; H04B 7/0617
 See application file for complete search history.

(56) References Cited

U.S. PATENT DOCUMENTS

| | | | | |
|---|---|---|---|---|
| 2015/0148041 A1* | 5/2015 | Ozkan | .................. | H04W 24/02 455/436 |
| 2017/0208560 A1* | 7/2017 | Papa | .................. | H04W 52/241 |
| 2019/0037525 A1* | 1/2019 | Liu | ...................... | H04L 5/0048 |

FOREIGN PATENT DOCUMENTS

| | | | |
|---|---|---|---|
| CN | 108023631 | A | 5/2018 |
| CN | 108064056 | A | 5/2018 |
| CN | 108064081 | A | 5/2018 |
| WO | 2017050295 | A1 | 3/2017 |
| WO | 2018059517 | A1 | 4/2018 |

OTHER PUBLICATIONS

First Search Report received in application No. CN201880090944.9 dated Sep. 2, 2021.
ISR in application PCT/CN2018/087951 dated Jan. 29, 2019.

\* cited by examiner

METHOD AND DEVICE FOR POSITIONING IN WIRELESS COMMUNICATION

CROSS REFERENCE TO RELATED APPLICATIONS

This application is a continuation of International Application No. PCT/CN2018/087951, filed May 23, 2018, claims the priority benefit of International Application No. PCT/CN2018/087951, filed on May 23, 2018, the full disclosure of which is incorporated herein by reference.

BACKGROUND

Technical Field

The disclosure relates to methods and devices in wireless communication systems, and in particular to a method and a device supporting positioning.

RELATED ART

In conventional wireless communication systems based on digital modulation modes, for example in 3rd Generation Partner Project (3GPP) cellular systems, traditional positioning methods include Cell Identifier (CID), Enhanced C ID (E-CID), Observed Time Difference of Arrival (OT-DOA), Uplink-TimeDifference Of Arrival (UTDOA), etc. The traditional positioning methods are based on a channel measurement performed by a User Equipment (UE) for a Positioning Reference Signal (PRS) or a Cell Reference Signal (CRS).

In 5G systems, massive Multiple Input Multiple Output (MIMO) and corresponding Beamforming (BF) technologies will be widely applied. However, downlink reference signals processed through BF will have significant directionalities. The currently employed positioning methods will have space to improve.

SUMMARY

Traditional PRS and CRS cannot indicate a beam direction; therefore, measurement information reported by a UE, for example, Reference Signal Receiving Power (RSRP), Reference Signal Receiving Quality (RSRQ) or time difference, can only help determine a distance to a transmitter and cannot determine a direction.

In view of the above problems, the disclosure provides a solution. It should be noted that embodiments of the disclosure and characteristics of the embodiments may be mutually combined arbitrarily, if not conflict is incurred. For example, the embodiments of the UE in the disclosure and the characteristics in the embodiments may be applied to the base station, and vice versa.

The disclosure provides a method in a first node for positioning, wherein the method includes:
transmitting Q1 first-type radio signal(s), the Q1 being a positive integer; and
transmitting first information.

Herein, the Q1 first-type radio signal(s) is(are) transmitted by Q1 spatial parameter group(s) respectively; the first information includes a first Identifier (ID) and Q1 piece(s) of channel information, and the first information is used for indicating Q1 geographic position(s); the Q1 piece(s) of channel information is(are) based on a channel measurement(s) performed by a target node for the Q1 spatial parameter group(s) respectively, and the target node is identified by the first ID; and the Q1 spatial parameter group(s) cover(s) the Q1 geographic position(s) respectively.

In one embodiment, a receiver of the first information can determine Q1 beam direction(s) according to the Q1 geographic position(s) respectively, thereby being capable of determining the position of the target node more accurately.

In one embodiment, the target node is one UE.

In one embodiment, the target node is one base station.

Specifically, according to one aspect of the disclosure, the method includes:
receiving a first radio signal.

Herein, the first radio signal carries the Q1 piece(s) of channel information.

In one embodiment, the first radio signal is transmitted by the target node.

In one embodiment, the first node is a base station, and the first radio signal is transmitted on a Physical Uplink Shared Channel (PUSCH).

In one embodiment, the first node is a base station, and the first radio signal is transmitted on a Physical Uplink Control Channel (PUCCH).

In one embodiment, the first node is a UE, and the first radio signal is transmitted on a Physical Sidelink Shared Channel (PSSCH).

In one embodiment, the first node is a UE, and the first radio signal is transmitted on a Physical Sidelink Control Channel (PSCCH).

In one embodiment, the first information includes Q1 angle(s), and the Q1 angle(s) correspond(s) to the Q1 spatial parameter group(s) respectively.

In one embodiment, the Q1 angle(s) is(are) related to a beam width(s) corresponding to the Q1 spatial parameter group(s) respectively.

In one embodiment, the Q1 angle(s) indicate(s) a 3 dB-attenuation beam width(s) of the Q1 spatial parameter group(s) respectively.

In one embodiment, each of the Q1 angle(s) is in unit of degree (a circle is equal to 360 degrees).

In one embodiment, each of the Q1 angle(s) is in unit of radian (a circle is equal to $\pi$ radians).

Specifically, according to one aspect of the disclosure, the first information includes Q1 cell portion ID(s), and the Q1 cell portion ID(s) is(are) used for identifying the Q1 geographic position(s) respectively.

In one embodiment, the Q1 geographic position(s) include(s) the latitude, longitude and altitude of an Access Point(s) corresponding to the Q1 cell portion ID(s) respectively.

In one embodiment, the above method includes:
the first node transmits Q1 piece(s) of first-type information.

Herein the Q1 piece(s) of first-type information indicate(s) the latitude, longitude and altitude corresponding to the Q1 cell portion ID(s) respectively.

In one embodiment, a receiver of the Q1 piece(s) of first-type information is a receiver of the first information.

In one embodiment, each of the Q1 piece(s) of first-type information includes one E-UTRAN Access Point Position Information Element (IE).

In one embodiment, the Q1 geographic position(s) belong(s) to Q1 cell portion(s) identified by the Q1 cell portion ID(s) respectively.

Specifically, according to one aspect of the disclosure, the first information includes Q1 node ID(s), and the Q1 node ID(s) is(are) used for identifying the Q1 geographic position(s) respectively In one embodiment, a receiver of the first information already knows the position(s) of the Q1 communication node(s) identified by the Q1 node ID(s); and the position(s) of the Q1 communication node(s) identified by the Q1 node ID(s) is(are) the Q1 geographic position(s).

In one embodiment, the Q1 communication nodes are all UEs.

In one embodiment, at least one of the Q1 communication nodes is a base station.

Specifically, according to one aspect of the disclosure, a beam center(s) corresponding to the Q1 spatial parameter group(s) correspond(s) to the Q1 geographic position(s) respectively; or, a beam center(s) of an analog beam(s) corresponding to the Q1 spatial parameter group(s) correspond(s) to the Q1 geographic position(s) respectively.

Specifically, according to one aspect of the disclosure, the method includes:

receiving Q1 second-type radio signal(s).

Herein, the Q1 second-type radio signal(s) is(are) transmitted by Q1 communication node(s) respectively, the Q1 node ID(s) indicate(s) the Q1 communication node(s) respectively, and a measurement(s) for the Q1 second-type radio signal(s) is(are) used for generating the Q1 spatial parameter group(s) respectively.

In one embodiment, the Q1 second-type radio signals are all reference signals.

In one embodiment, the Q1 communication nodes are all UEs, and the Q1 second-type radio signals all include a synchronization signal.

In one embodiment, the Q1 communication nodes are all UEs, and the Q1 second-type radio signals all include a Sounding Reference Signal (SRS).

Specifically, according to one aspect of the disclosure, the method includes:

receiving second information.

Herein, the second information is used for triggering a transmission of the first information.

In one embodiment, a transmitter of the second information is a receiver of the first information.

In one embodiment, the second information is transmitted through a wired link.

In one embodiment, the second information is transmitted through an air interface.

In one embodiment, the second information includes partial or all IEs in an E-CID MEASUREMENT INITIATION REQUEST.

The disclosure provides a method in a second node for positioning, wherein the method includes:

receiving first information.

Herein, the first information includes a first ID and Q1 piece(s) of channel information, and the first information is used for indicating Q1 geographic position(s); the Q1 piece(s) of channel information is(are) based on a channel measurement(s) performed by a target node for Q1 spatial parameter group(s) respectively, and the target node is identified by the first ID; the Q1 spatial parameter group(s) cover(s) the Q1 geographic position(s) respectively; and the Q1 is a positive integer.

In one embodiment, the second node is an Evolved Serving Mobile Location Center (E-SMLC).

In one embodiment, the second node is a Location Management Function (LMF).

In one embodiment, the second node is a base station.

Specifically, according to one aspect of the disclosure, the first information includes Q1 cell portion ID(s), and the Q1 cell portion ID(s) is(are) used for identifying the Q1 geographic position(s) respectively.

Specifically, according to one aspect of the disclosure, the first information includes Q1 node ID(s), and the Q1 node ID(s) is(are) used for identifying the Q1 geographic position(s) respectively.

Specifically, according to one aspect of the disclosure, a beam center(s) corresponding to the Q1 spatial parameter group(s) correspond(s) to the Q1 geographic position(s) respectively; or, a beam center(s) of an analog beam(s) corresponding to the Q1 spatial parameter group(s) correspond(s) to the Q1 geographic position(s) respectively.

Specifically, according to one aspect of the disclosure, a measurement(s) for Q1 second-type radio signal(s) is(are) used for generating the Q1 spatial parameter group(s) respectively, the Q1 second-type radio signal(s) is(are) transmitted by the Q1 communication node(s) respectively, the Q1 node ID(s) indicate(s) the Q1 communication node(s) respectively.

Specifically, according to one aspect of the disclosure, the method includes:

transmitting second information.

Herein, the second information is used for triggering a transmission of the first information.

The disclosure provides a first node for positioning, wherein the first node includes:

a first transmitter, to transmit Q1 first-type radio signal(s), the Q1 being a positive integer; and a second transmitter, to transmit first information.

Herein, the Q1 first-type radio signal(s) is(are) transmitted by Q1 spatial parameter group(s) respectively; the first information includes a first ID and Q1 piece(s) of channel information, and the first information is used for indicating Q1 geographic position(s); the Q1 piece(s) of channel information is(are) based on a channel measurement(s) performed by a target node for the Q1 spatial parameter group(s) respectively, and the target node is identified by the first ID; and the Q1 spatial parameter group(s) cover(s) the Q1 geographic position(s) respectively.

In one embodiment, the above first node includes:

a first receiver, to receive a first radio signal.

Herein, the first radio signal carries the Q1 piece(s) of channel information.

In one embodiment, the first node is characterized in that: the first receiver receives Q1 second-type radio signal(s); wherein the Q1 second-type radio signal(s) is(are) transmitted by Q1 communication node(s) respectively, the Q1 node ID(s) indicate(s) the Q1 communication node(s) respectively, and a measurement(s) for the Q1 second-type radio signal(s) is(are) used for generating the Q1 spatial parameter group(s) respectively In one embodiment, the above first node includes:

a second receiver, to receive second information.

Herein, the second information is used for triggering a transmission of the first information.

In one embodiment, the above first node is characterized in that: the first information includes Q1 cell portion ID(s), and the Q1 cell portion ID(s) is(are) used for identifying the Q1 geographic position(s) respectively.

In one embodiment, the above first node is characterized in that: the first information includes Q1 node ID(s), and the Q1 node ID(s) is(are) used for identifying the Q1 geographic position(s) respectively.

In one embodiment, the above first node is characterized in that: a beam center(s) corresponding to the Q1 spatial parameter group(s) correspond(s) to the Q1 geographic position(s) respectively; or, a beam center(s) of an analog beam(s) corresponding to the Q1 spatial parameter group(s) correspond(s) to the Q1 geographic position(s) respectively.

The disclosure provides a second node for positioning, wherein the second node includes:

a third receiver, to receive first information.

Herein, the first information includes a first ID and Q1 piece(s) of channel information, and the first information is used for indicating Q1 geographic position(s); the Q1 piece(s) of channel information is(are) based on a channel measurement(s) performed by a target node for Q1 spatial parameter group(s) respectively, and the target node is identified by the first ID; the Q1 spatial parameter group(s) cover(s) the Q1 geographic position(s) respectively; and the Q1 is a positive integer.

In one embodiment, the above second node includes:

a third transmitter, to transmit second information.

Herein, the second information is used for triggering a transmission of the first information.

In one embodiment, the above second node is characterized in that: the first information includes Q1 cell portion ID(s), and the Q1 cell portion ID(s) is(are) used for identifying the Q1 geographic position(s) respectively.

In one embodiment, the above second node is characterized in that: the first information includes Q1 node ID(s), and the Q1 node ID(s) is(are) used for identifying the Q1 geographic position(s) respectively.

In one embodiment, the above second node is characterized in that: a beam center(s) corresponding to the Q1 spatial parameter group(s) correspond(s) to the Q1 geographic position(s) respectively; or, a beam center(s) of an analog beam(s) corresponding to the Q1 spatial parameter group(s) correspond(s) to the Q1 geographic position(s) respectively.

In one embodiment, the above second node is characterized in that: a measurement(s) for Q1 second-type radio signal(s) is(are) used for generating the Q1 spatial parameter group(s) respectively, the Q1 second-type radio signal(s) is(are) transmitted by Q1 communication node(s) respectively, and the Q1 node ID(s) indicate(s) the Q1 communication node(s) respectively.

In one embodiment, compared with the prior art, the disclosure has the following advantages.

Beam directions of reference signals are utilized to improve the precision of positioning.

It has a good compatibility with existing cellular system.

The UE does not need to feed back a new type of channel information; therefore, there is no influence or a little influence on the UE.

BRIEF DESCRIPTION OF TH E DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
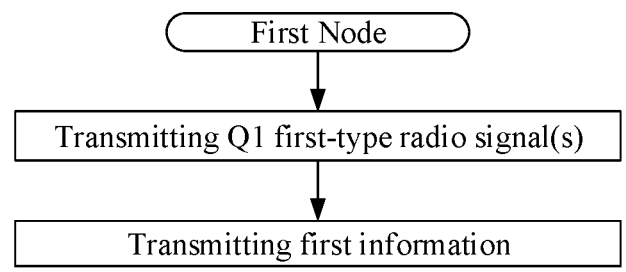
FIG. 1 is a flowchart of transmitting first information according to one embodiment of the disclosure.

Embodiment 1 illustrates a flowchart of transmitting first information, as shown in FIG. 1.

In Embodiment 1, a first node first transmits Q1 first-type radio signal(s), the Q1 being a positive integer, and then transmits first information.

In Embodiment 1, the Q1 first-type radio signal(s) is(are) transmitted by Q1 spatial parameter group(s) respectively; the first information includes a first ID and Q1 piece(s) of channel information, and the first information is used for indicating Q1 geographic position(s); the Q1 piece(s) of channel information is(are) based on a channel measurement(s) performed by a target node for the Q1 spatial parameter group(s) respectively, and the target node is identified by the first ID; and the Q1 spatial parameter group(s) cover(s) the Q1 geographic position(s) respectively.

In one embodiment, the first node is a UE.

In one embodiment, the first node is a base station.

In one embodiment, the Q1 spatial parameter group(s) is(are) Q1 antenna port group(s) respectively, and each of the Q1 antenna port group(s) includes a positive integer number of antenna ports.

In one embodiment, the Q1 is greater than 1, and each of the Q1 antenna port groups includes a same number of antenna ports.

In one embodiment, the Q1 is greater than 1, and at least two of the Q1 antenna port groups include different numbers of antenna ports.

In one embodiment, the Q1 is greater than 1, and each of the Q1 antenna port groups includes one antenna port.

In one embodiment, small-scale fading experienced by a radio signal transmitted by any one of the Q1 spatial parameter group(s) cannot be used to deduce small-scale fading experienced by a radio signal transmitted by another one of the Q1 spatial parameter group(s).

In one embodiment, for two radio signals transmitted by any one given Q1 spatial parameter group among the Q1 spatial parameter group(s), if time resources occupied by the two radio signals are within a coherent time and frequency domain resources occupied by the two radio signals are within a coherent bandwidth, small-scale fading experienced by one radio signal can be used to deduce small-scale fading experienced by the other radio signal.

In one embodiment, the small-scale fading includes a Channel Impulse Response (CIR).

In one embodiment, the Q1 spatial parameter group(s) include(s) Q1 beamforming vector(s) respectively, the Q1 beamforming vector(s) is(are) used for forming Q1 beam(s) respectively, and the Q1 beam(s) is(are) used for transmitting the Q1 first-type radio signal(s) respectively.

In one embodiment, the Q1 beams are all analog beams.

In one embodiment, the Q1 beam direction(s) mean(s) that a geographic position of the first node points to the Q1 geographic position(s) respectively.

In one embodiment, the Q1 first-type radio signals are all reference signals.

In one embodiment, the first node is a base station, and the Q1 first-type radio signals are all PRSs.

In one embodiment, the first node is a base station, and each of the Q1 first-type radio signal(s) includes a Channel Status Information Reference Signal (CSI-RS).

In one embodiment, the first node is a UE, and each of the Q1 first-type radio signal(s) includes an SRS.

In one embodiment, the first node is a UE, and each of the Q1 first-type radio signal(s) includes an SRS.

In one embodiment, each of the Q1 first-type radio signal(s) includes a synchronization signal.

In one embodiment, a measurement(s) for the Q1 first-type radio signal(s) is(are) used for generating the Q1 piece(s) of channel information respectively.

In one embodiment, a measurement(s) for the Q1 spatial parameter group(s) is(are) used for generating the Q1 piece(s) of channel information respectively.

In one embodiment, the Q1 is greater than 1.

In one embodiment, the Q1 is 1.

In one embodiment, the first information is transmitted through a wired link.

In one embodiment, the wired link includes an optical fiber.

In one embodiment, the wired link includes a coaxial cable.

In one embodiment, the first information is transmitted through an air interface.

In one embodiment, the first information includes partial or all IEs in an E-CID MEASUREMENT INITIATION RESPONSE.

In one embodiment, the first information includes partial or all IEs in an E-CID Measurement Result.

In one embodiment, each of the Q1 geographic position(s) includes a latitude and a longitude.

In one embodiment, each of the Q1 geographic position(s) includes an altitude.

In one embodiment, the Q1 geographic positions are of a same altitude.

In one embodiment, the first information includes the Q1 geographic position(s).

In one embodiment, the first information includes Q1 index(es), and the Q1 index(es) indicate(s) the Q1 geographic position(s) respectively.

In one embodiment, the first ID is one integer.

In one embodiment, the first ID is an E-SMLC UE Measurement ID.

In one embodiment, the first ID is an eNB UE Measurement ID.

In one embodiment, the first ID is an LMF UE Measurement ID.

In one embodiment, the first ID is a gNB UE Measurement ID.

In one embodiment, the phrase that the Q1 piece(s) of channel information is(are) based on a channel measurement(s) performed by a target node for the Q1 spatial parameter group(s) respectively includes: the target node estimates the Q1 piece(s) of channel information according to the received Q1 first-type radio signal(s) respectively.

In one embodiment, the phrase that the Q1 piece(s) of channel information is(are) based on a channel measurement(s) performed by a target node for the Q1 spatial parameter group(s) respectively includes: the target node receives Q1 radio signal(s), the received Q1 radio signal(s) is(are) used for estimating the Q1 piece(s) of channel information respectively, the Q1 radio signal(s) is(are) transmitted by the Q1 spatial parameter group(s) respectively, and the Q1 radio signal(s) include(s) the Q1 first-type radio signal(s) respectively.

In one embodiment, each of the Q1 piece(s) of channel information includes an RSRP.

In one embodiment, each of the Q1 piece(s) of channel information includes an RSRQ.

In one embodiment, each of the Q1 piece(s) of channel information includes an Angle of Arriving (AoA)

In one embodiment, the synchronization signal includes a Primary Synchronization Signal (PSS) and a Secondary Synchronization Signal (SSS).

In one embodiment, each of the Q1 first-type radio signal(s) occupies multiple Resource Elements (REs); and the RE occupies one subcarrier in frequency domain and one multicarrier symbol in time domain.

In one embodiment, the multicarrier symbol is an Orthogonal Frequency Division Multiplexing (OFDM) symbol.

In one embodiment, the multicarrier symbol is a Single Carrier Frequency Division Multiplexing Access (SC-FDMA) symbol.

In one embodiment, the multicarrier symbol is a Filter Bank Multi-Carrier (FBMC) symbol.

Embodiment 2

Figure 2:
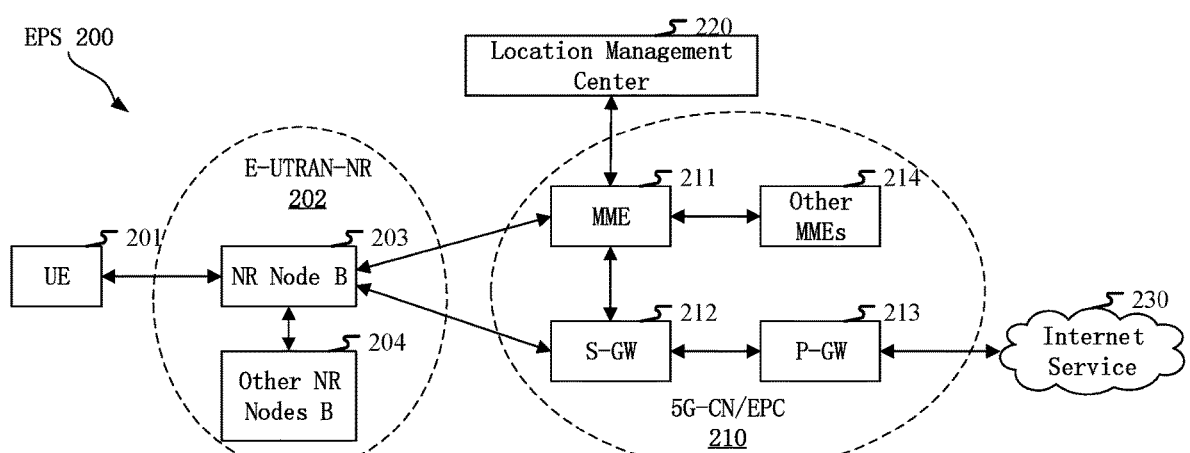
FIG. 2 is a diagram illustrating a network architecture according to one embodiment of the disclosure.

Embodiment 2 illustrates a diagram of a network architecture, as shown in FIG. 2.

FIG. 2 illustrates a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may include one or more UEs 201, an Evolved UMTS Terrestrial Radio Access Network-New Radio (E-UTRAN-NR) 202, a 5G-Core Network/Evolved Packet Core (5G-CN/EPC) 210, a Location Management Center 220 and an Internet Service 230. Herein, the UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services. The E-UTRAN-NR includes an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the 5G-CN/EPC 210 via an S1 interface. The 5G-CN/EPC 210 includes an MME 211, other MMEs 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs). The Location Management Center 220 is a logical node for the core network and it manages the resource scheduling and collaboration needed by the positioning of the UE connected to the E-UTRAN-NR202; the Location Management Center 220 calculates the final position of the UE, the moving speed of the UE and the precision of positioning according to received channel measurements.

In one embodiment, the UE 201 corresponds to the first node in the disclosure.

In one embodiment, the gNB 203 corresponds to the first node in the disclosure.

In one embodiment, the Location Management Center corresponds to the second node in the disclosure.

In one subembodiment, the Location Management Center is an E-SMLC.

In one subembodiment, the Location Management Center is an LMF.

Embodiment 3

Figure 3:
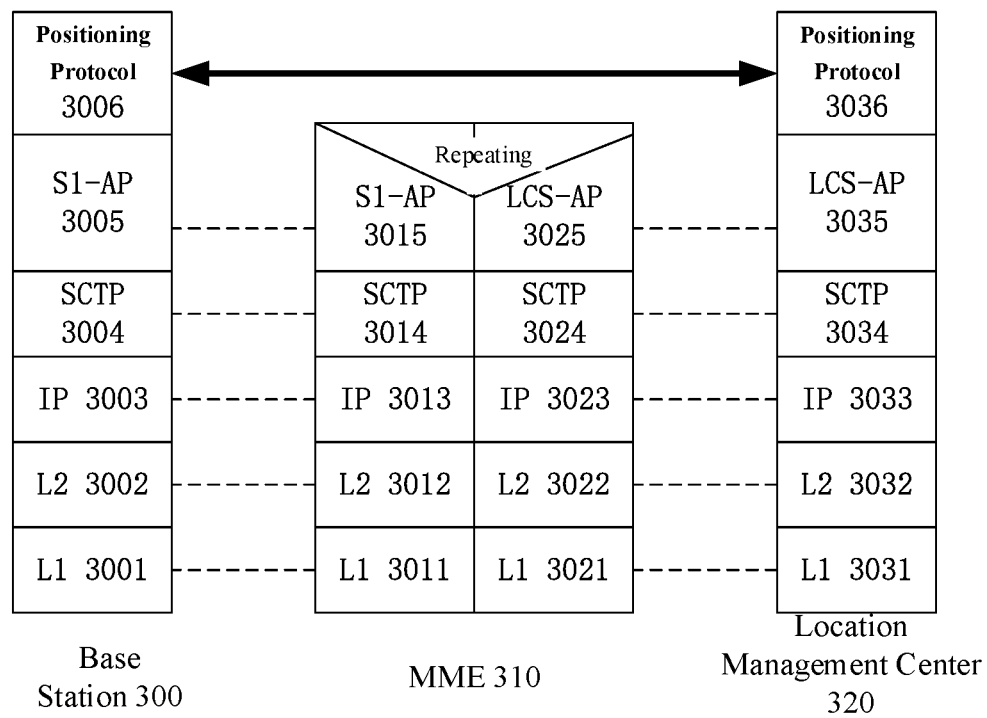
FIG. 3 is a diagram illustrating a protocol architecture between a base station, a mobility management entity and a location management center according to one embodiment of the disclosure.

Embodiment 3 illustrates a diagram of a protocol architecture between a base station, a mobility management entity and a location management center, as shown in FIG. 3.

In FIG. 3, a base station 300 is connected to a location management center 320 through a Mobility Management Entity (MME) 310.

A protocol stack in the base station 300 includes six layers from the bottom up, which are a Layer 1 (L1) 3001, a Layer 2 (L2) 3002, an Internet Protocol (IP) 3003, a Stream Control Transmission Protocol (SCTP) 3004, an S1 Application Protocol (S1-AP) 3005 and a positioning protocol 3006 respectively.

An interface of the MME 310 facing the base station 300 includes five layers from the bottom up, which are an L1 3011, an L2 3012, an IP 3013, an SCTP 3014 and an S1-AP 3015 respectively; while an interface facing the location management center 320 includes five layers from the bottom up, which are an L1 3021, an L2 3022, an IP 3023, an SCTP 3024 and an S1-AP 3025 respectively; the MME 310 repeats data between the base station 300 and the location management center 320.

The location management center 320 includes six layers from the bottom up, which are an L1 3031, an L2 3032, an IP 3033, an SCTP 3034, an S1-AP 3035 and a positioning protocol 3036 respectively.

In one embodiment, communication between the positioning protocol 3006 and the positioning protocol 3036 is transparent for the MME 310.

In one embodiment, the positioning protocol 3006 and the positioning protocol 3036 are both LTE Positioning Protocol A (LPPa).

In one subembodiment, the first node in the disclosure is the base station 300, and the second node in the disclosure is the location management center 320, that is, E-SMLC.

In one embodiment, the positioning protocol 3006 and the positioning protocol 3036 are both New Radio Positioning Protocol A (NRPPa).

In one subembodiment, the first node in the disclosure is the base station 300, and the second node in the disclosure is the location management center 320, that is, LMF.

Embodiment 4

Figure 4:
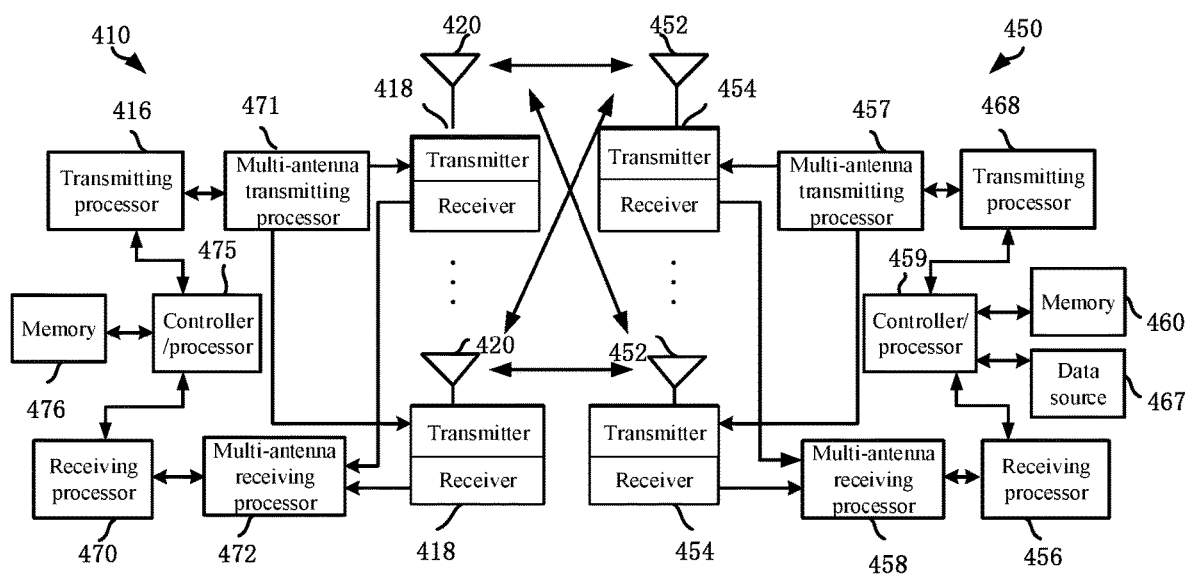
FIG. 4 is a diagram illustrating a first communication node and a second communication node according to one embodiment of the disclosure.

Embodiment 4 illustrates a diagram of a first communication node and a second communication node, as shown in FIG. 4. FIG. 4 is a block diagram of a first communication node 450 and a second communication node 410 that are in communication with each other in an access network.

The second communication node 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The first communication node 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

For a link from the second communication node 410 to the first communication node 450, at the second communication node 410, a higher-layer packet from a core network is provided to the controller/processor 475. The controller/processor 475 provides functions of a higher layer, and the higher layer include sublayers such as Medium Access Control (MAC), Radio Link Control (RLC) and Packet Data Convergence Protocol (PDCP), etc. The controller/processor 475 provides header compression, encryption, packet segmentation and reordering, multiplexing between a logical channel and a transport channel, and a radio resource allocation for the first communication node 450 based on various priority metrics. The controller/processor 475 is also in charge of HARQ operations, retransmission of lost packets, and signalings to the first communication node 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the first communication node 450 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding/beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with transmitting analog precoding/beamforming. Each transmitter 418 converts a baseband multicarrier symbol stream provided by the multi-antenna transmitting processor 471 into a radio frequency stream and then provides it to different antennas 420.

For a link from the second communication node 410 to the first communication node 450, at the first communication node 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of PHY. The multi-antenna receiving processor 458 processes the baseband multicarrier symbol stream coming from the receiver 454 with receiving analog precoding/beamforming. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication node 410. Next, the higher-layer data and control signal are provided to the controller/processor 459. The controller/processor 459 performs functions of a higher layer. The controller/processor 459 may be connected to the memory 460 that stores program codes and data. The memory 460 may be called a computer readable media. The controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above the higher layer, or various control signals can be provided to the RRC layer for processing. The controller/processor 459 also performs error detection using ACK and/or NACK protocols to support HARQ operations.

For a link from the first communication node 450 to the second communication node 410, at the first communication node 450, the data source 467 provides a higher-layer packet to the controller/processor 459. The data source 467 illustrates all protocol layers above a higher layer. Similar as the transmitting function of the second communication node 410 described in the link from the second communication node 410 to the first communication node 450, the controller/processor 459 provides header compression, encryption, packet segmentation and reordering, and multiplexing between a logical channel and a transport channel based on radio resource allocation of the second communication node 410 so as to provide the functions of a higher layer used for the control plane and user plane. The controller/processor 459 is also in charge of HARQ operations, retransmission of lost packets, and signalings to the second communication node 410. The transmitting processor 468 conducts modulation mapping and channel encoding processing; the multi-antenna transmitting processor 457 performs digital multi-antenna spatial precoding/beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

For a link from the first communication node 450 to the second communication node 410, the function of the second communication node 410 is similar as the receiving function of the first communication node 450 described in the link from second communication node 410 to the first communication node 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of PHY. The controller/processor 475 provides functions of a higher layer. The controller/processor 475 may be connected to the memory 476 that stores program codes and data. The memory 476 may be called a computer readable media. The controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network. The controller/processor 475 also performs error detection using ACK and/or NACK protocols to support HARQ operations.

In one embodiment, the first communication node 450 is a UE, the second communication node 410 is a base station, and the first node in the disclosure is the second communication node 410.

In one subembodiment, the target node in the disclosure the first communication node 450.

In one embodiment, the first communication node 450 is a UE, the second communication node 410 is a base station, and the first node in the disclosure is the first communication node 450.

In one embodiment, the first communication node 450 is a UE, and the second communication node 410 is a UE.

In one subembodiment, the first node in the disclosure is the second communication node 410, and the target node in the disclosure is the first communication node 450.

In one embodiment, the first communication node 450 includes a memory that stores a computer readable instruction program. The computer readable instruction program generates an action when executed by at least one processor. The action includes: transmitting Q1 first-type radio signal(s), the Q1 being a positive integer; and transmitting first information; wherein the Q1 first-type radio signal(s) is(are) transmitted by Q1 spatial parameter group(s) respectively; the first information includes a first Identifier (ID) and Q1 piece(s) of channel information, and the first information is used for indicating Q1 geographic position(s); the Q1 piece(s) of channel information is(are) based on a channel measurement(s) performed by a target node for the Q1 spatial parameter group(s) respectively, and the target node is identified by the first ID; and the Q1 spatial parameter group(s) cover(s) the Q1 geographic position(s) respectively.

In one embodiment, the second communication node 410 includes: transmitting Q1 first-type radio signal(s), the Q1 being a positive integer; and transmitting first information; wherein the Q1 first-type radio signal(s) is(are) transmitted by Q1 spatial parameter group(s) respectively; the first information includes a first Identifier (ID) and Q1 piece(s) of channel information, and the first information is used for indicating Q1 geographic position(s); the Q1 piece(s) of channel information is(are) based on a channel measurement(s) performed by a target node for the Q1 spatial parameter group(s) respectively, and the target node is identified by the first ID; and the Q1 spatial parameter group(s) cover(s) the Q1 geographic position(s) respectively.

Embodiment 5

Figure 5:
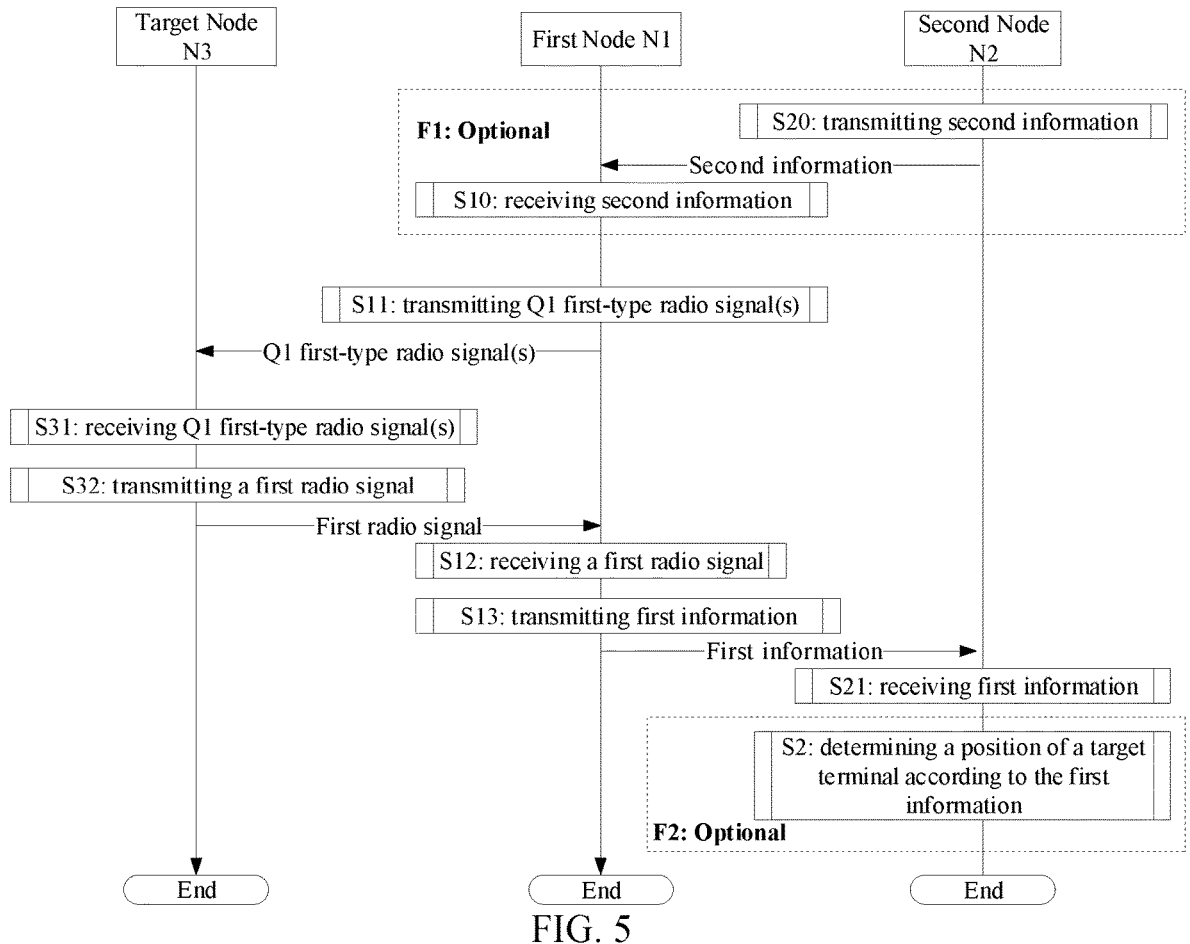
FIG. 5 is a flowchart of communication between a first node and a second node according to one embodiment of the disclosure.

Embodiment 5 illustrates a flowchart of wireless transmission, as shown in FIG. 5. Steps in box F1 and F2 are optional.

A first node N1 receives second information in S10, transmits Q1 first-type radio signal(s) in S11, receives a first radio signal in S12, and transmits first information in S13.

A second node N2 transmits second information in S20, receives first information in S21, and determines a position of a target terminal according to the first information in S22.

A target terminal N3 receives Q1 first-type radio signal(s), and obtains Q1 piece(s) of channel information according to the received Q1 first-type radio signal(s) respectively in S31, and transmits a first radio signal in S32.

In Embodiment 5, the Q1 first-type radio signal(s) is(are) transmitted by Q1 spatial parameter group(s) respectively; the first information includes a first ID and Q1 piece(s) of channel information, and the first information is used for indicating Q1 geographic position(s); the target node N1 is identified by the first ID; the Q1 spatial parameter group(s) cover(s) the Q1 geographic position(s) respectively; the first radio signal carries the Q1 piece(s) of channel information; and the second information is used for triggering a transmission of the first information.

In one embodiment, the target node N3 is a UE.

In one embodiment, the first node N1 is a base station, and the second node N2 is an E-SMLC.

In one embodiment, the first node N1 is a base station, and the second node N2 is an LMF.

In one embodiment, the first node N1 is a UE, and the second node N2 is an E-SMLC.

In one embodiment, the first node N1 is a UE, and the second node N2 is an LMF.

In one embodiment, the first node N1 is a maintenance base station for a serving cell of the target node N3.

In one embodiment, the first information and the second information are both transmitted through a wired link.

In one embodiment, the first information is transmitted within a given time window, and a start time of the given time window is related to time domain resources occupied by the second information.

In one embodiment, a start time of the given time window is a Q1th subframe behind time domain resources occupied by the second information, wherein the Q1 is fixed (unconfigurable).

In one embodiment, the given time window has a fixed length.

In one embodiment, a position of time domain resources occupied by the first information in the given time window is autonomously determined by the first node N1.

In one embodiment, the first information includes Q1 cell portion ID(s), and the Q1 cell portion ID(s) is(are) used for identifying the Q1 geographic position(s) respectively.

In one embodiment, the first information includes Q1 node ID(s), and the Q1 node ID(s) is(are) used for identifying the Q1 geographic position(s) respectively.

In one embodiment, the Q1 spatial parameter group(s) is(are) Q1 antenna port group(s) respectively, and each of the Q1 antenna port group(s) includes a positive integer number of antenna ports.

In one embodiment, small-scale fading experienced by a radio signal transmitted by any one of the Q1 spatial parameter group(s) cannot be used to deduce small-scale fading experienced by a radio signal transmitted by another one of the Q1 spatial parameter group(s).

In one embodiment, for two radio signals transmitted by any one given Q1 spatial parameter group among the Q1 spatial parameter group(s), if time resources occupied by the two radio signals are within a coherent time and frequency domain resources occupied by the two radio signals are within a coherent bandwidth, small-scale fading experienced by one radio signal can be used to deduce small-scale fading experienced by the other radio signal.

In one embodiment, the small-scale fading includes a CIR.

In one embodiment, the first node N1 is a base station, and the Q1 first-type radio signals are all PRSs.

In one embodiment, the first node N1 is a base station, and each of the Q1 first-type radio signal(s) includes a CSI-RS.

In one embodiment, the first node N1 is a UE, and each of the Q1 first-type radio signal(s) includes an SRS.

In one embodiment, the first node N1 is a UE, and each of the Q1 first-type radio signal(s) includes an SRS.

In one embodiment, each of the Q1 first-type radio signal(s) includes a synchronization signal.

In one embodiment, the Q1 is greater than 1.

In one embodiment, the Q1 is 1.

In one embodiment, the first information includes partial or all IEs in an E-CID MEASUREMENT INITIATION RESPONSE.

In one embodiment, the first information includes partial or all IEs in an E-CID Measurement Result.

In one embodiment, each of the Q1 geographic position(s) includes a latitude and a longitude.

In one embodiment, each of the Q1 geographic position(s) includes an altitude.

In one embodiment, the Q1 geographic positions are of a same altitude.

In one embodiment, the first information includes the Q1 geographic position(s).

In one embodiment, the first information includes Q1 index(es), and the Q1 index(es) indicate(s) the Q1 geographic position(s) respectively.

In one embodiment, the first ID is one integer.

In one embodiment, the first ID is an E-SMLC UE Measurement ID.

In one embodiment, the first ID is an eNB UE Measurement ID.

In one embodiment, the first ID is an LMF UE Measurement ID.

In one embodiment, the first ID is a gNB UE Measurement ID.

In one embodiment, the target node N3 estimates the Q1 piece(s) of channel information according to the received Q1 first-type radio signal(s) respectively.

In one embodiment, the target node N3 receives Q1 radio signal(s), the received Q1 radio signal(s) is(are) used for estimating the Q1 piece(s) of channel information respectively, the Q1 radio signal(s) is(are) transmitted by the Q1 spatial parameter group(s) respectively, and the Q1 radio signal(s) include(s) the Q1 first-type radio signal(s) respectively.

In one embodiment, each of the Q1 piece(s) of channel information includes an RSRP.

In one embodiment, each of the Q1 piece(s) of channel information includes an RSRQ.

In one embodiment, each of the Q1 piece(s) of channel information includes an Angle of Arriving (AoA)

In one embodiment, the synchronization signal includes a PSS and an SSS.

Embodiment 6

Figure 6:
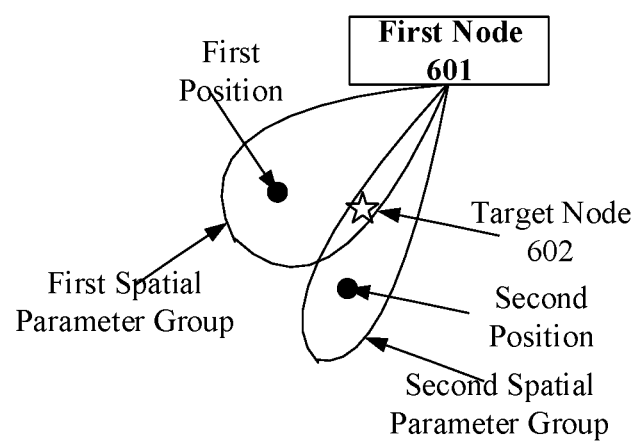
FIG. 6 is a diagram illustrating spatial parameter groups according to one embodiment of the disclosure.

Embodiment 6 illustrates a diagram of spatial parameter groups, as shown in FIG. 6.

In Embodiment 6, a first node 601 transmits two first-type radio signals using a first spatial parameter group and a second spatial parameter group respectively; a beam corresponding to the first spatial parameter group and a beam corresponding to the second spatial parameter group cover a first position and a second position shown in FIG. 6 respectively; the first node 601 transmits first information; the first information includes a first ID and 2 pieces of channel information, and the first information is used for indicating the first position and the second position.

In Embodiment 6, the 2 pieces of channel information are based on channel measurements performed by the target node 602 for the first spatial parameter group and the second spatial parameter group respectively, and the target node 602 is identified by the first ID; the first position includes a latitude and a longitude, and the second positions includes a latitude and a longitude.

In one embodiment, compared with conventional positioning schemes, a second node can determine, according to the received first information, that the target node 602 is located in an overlapping scope between a beam corresponding to the first spatial parameter group and a beam corresponding to the second spatial parameter group, thereby improving the precision of positioning.

In one embodiment, the first spatial parameter group and the second spatial parameter group include a first beamforming vector and a second beamforming vector respectively, the first beamforming vector and the second beamforming vector are used for generating a beam corresponding to the first spatial parameter group and a beam corresponding to the second spatial parameter group respectively.

In one embodiment, the first beamforming vector and the second beamforming vector are both used for generating an analog beam, that is to say, the beam corresponding to the first spatial parameter group and the beam corresponding to the second spatial parameter group are both analog beams.

In one embodiment, the first information includes 2 cell portion IDs, and geographic positions of Access Points corresponding to the 2 cell portion IDs are the first position and the second position respectively.

In one embodiment, the first node 601 receives two second-type radio signals; wherein the first information incudes two node IDs, the two second-type radio signals are transmitted by two communication nodes respectively, the two node IDs indicate the two communication nodes respectively, and channel measurements performed by the first node 601 for the two second-type radio signals are used for generating the first spatial parameter group and the second spatial parameter group respectively; and geographic positions of the two communication nodes are a first position and a second position respectively.

In one subembodiment, the first beam forming vector and the second beamforming vector are used for receiving the two second-type radio signals respectively.

In one subembodiment, the first node 601 estimates two channel parameters according to the received two second-type radio signals respectively, and the first beamforming vector and the second beamforming vector correspond to Maximum Ration Transmissions (MRTs) of the two channel parameters respectively.

In one subembodiment, beamforming vectors used for receiving the two second-type radio signals are spatially related to the first beamforming vector and the second beamforming vector respectively.

In one embodiment, if large-scale fading corresponding to a beam generated by one beamforming vector can be used for deduce large-scale fading corresponding to a beam generated by another beamforming vector, the one beamforming vector is QCLed with the another beamforming vector.

In one embodiment, the large-scale fading includes a maximum multipath latency.

In one embodiment, the large-scale fading includes a maximum Doppler frequency offset.

Embodiment 7

Figure 7:
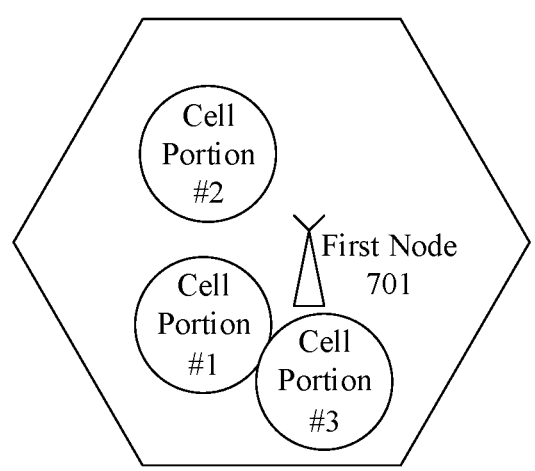
FIG. 7 is a diagram illustrating cell portions according to one embodiment of the disclosure.

Embodiment 7 illustrates a diagram of cell portions, as shown in FIG. 7.

In FIG. 7, a first node 701 is a serving cell, including three cell portions, that is, a cell portion #1, a cell portion #2 and a cell portion #3.

The three cell portions are identified by three cell portion IDs respectively, the first information in the disclosure includes the three cell portion IDs, and the Q1 cell portion IDs are used for identifying the Q1 geographic positions respectively. The first node has reported geographic positions of APs corresponding to the three cell portions to a second node in advance; therefore, the second node is capable of determining corresponding beam directions according to the three cell portion IDs.

One advantage of the Embodiment 7 is that there isn't any new parameter defined to describe beam directions, which has a good compatibility with existing systems.

Embodiment 8

Figure 8:
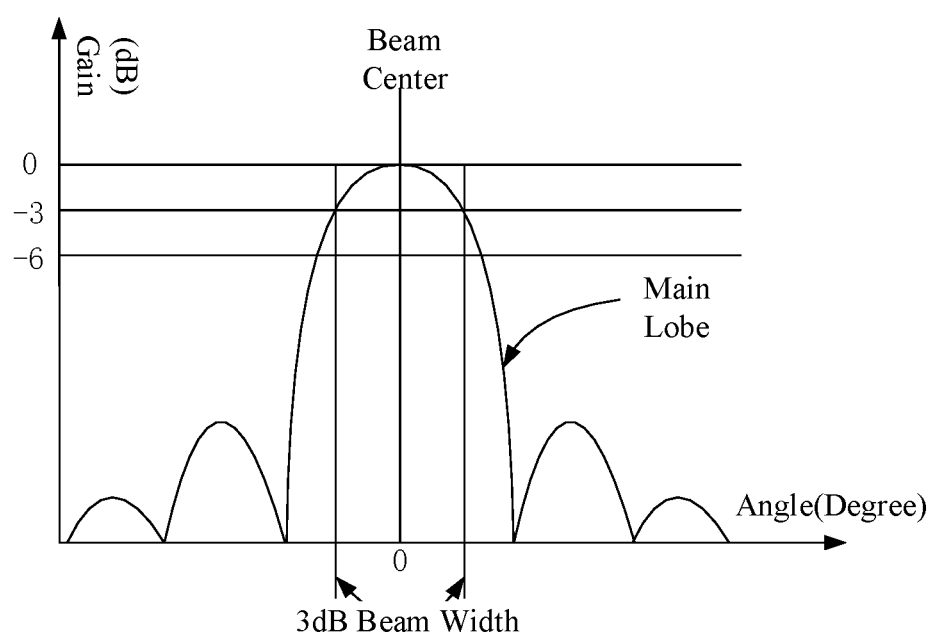
FIG. 8 is a diagram illustrating a beam corresponding to a spatial parameter group according to one embodiment of the disclosure.

Embodiment 8 illustrates a diagram of a beam corresponding to a spatial parameter group, as shown in FIG. 8.

In FIG. 8, a beam corresponding to a spatial parameter group includes a main lobe and a side lobe, and a center direction of the main lobe is a corresponding angle 0 of the beam center.

In one embodiment, a beam corresponding to any one of the Q1 spatial parameter group(s) in the disclosure can be described as in FIG. 8, and any one of the Q1 piece(s) of channel information in the disclosure indicates a 3 dB beam width of a beam corresponding to a corresponding spatial parameter group, that is, a bandwidth of a main lobe power attenuated by 3 dB.

In one embodiment, beam center(s) corresponding to the Q1 spatial parameter group(s) correspond(s) to the Q1 geographic position(s) respectively.

In one embodiment, an analog beam corresponding to any one of the Q1 spatial parameter group(s) in the disclosure can be described as in FIG. 8, and any one of the Q1 piece(s) of channel information in the disclosure indicates a 3 dB beam width of a beam corresponding to a corresponding spatial parameter group, that is, a bandwidth of a main lobe power attenuated by 3 dB.

In one embodiment, beam center(s) of analog beam(s) corresponding to the Q1 spatial parameter group(s) correspond(s) to the Q1 geographic position(s) respectively.

Embodiment 9

Figure 9:
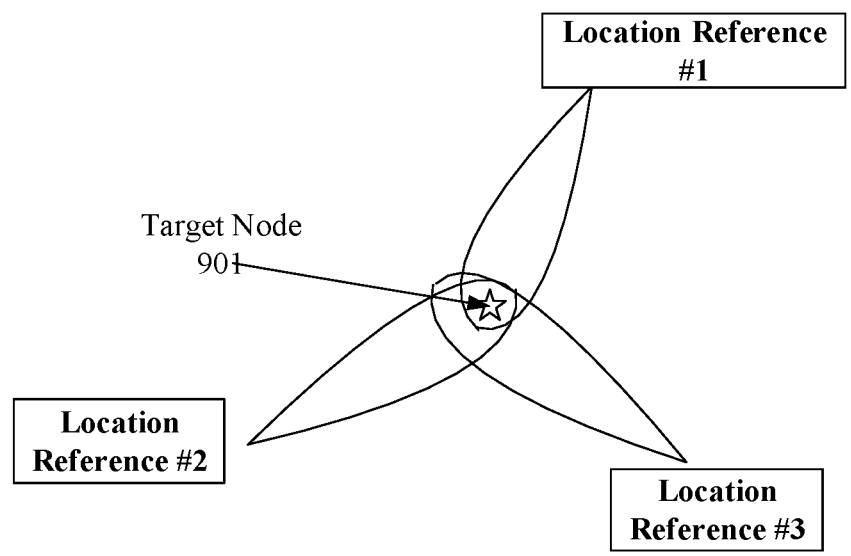
FIG. 9 is a diagram of positioning a target node using three location references according to one embodiment of the disclosure.

Embodiment 9 illustrates a diagram of positioning a target node using three location references, as shown in FIG. 9.

In FIG. 9, the target node are capable of receiving first-type radio signals transmitted from three location references, and any one of the three location references, which includes a location reference #1, a location reference #2 and a location reference #3, may be viewed as the first node in the disclosure.

The three location references feed back to a second node the positions (that is, beam directions) which the transmitted first-type radio signals point to respectively, and the second node can determine a possible area of the target node according to an overlapping area of the three beam directions.

Compared with omnidirectionally transmitted radio signals, the scheme in Embodiment 9 can narrow the area where the target node is located, thereby improving the precision of positioning.

In one embodiment, the three location references are three serving cells respectively, and the target node is one UE.

In one embodiment, the three location references are three UEs respectively, and the target node is one UE.

In one embodiment, at least one of the three location references is one serving cell and one of the three location references is one UE, and the target node is one UE.

Embodiment 10

Figure 10:
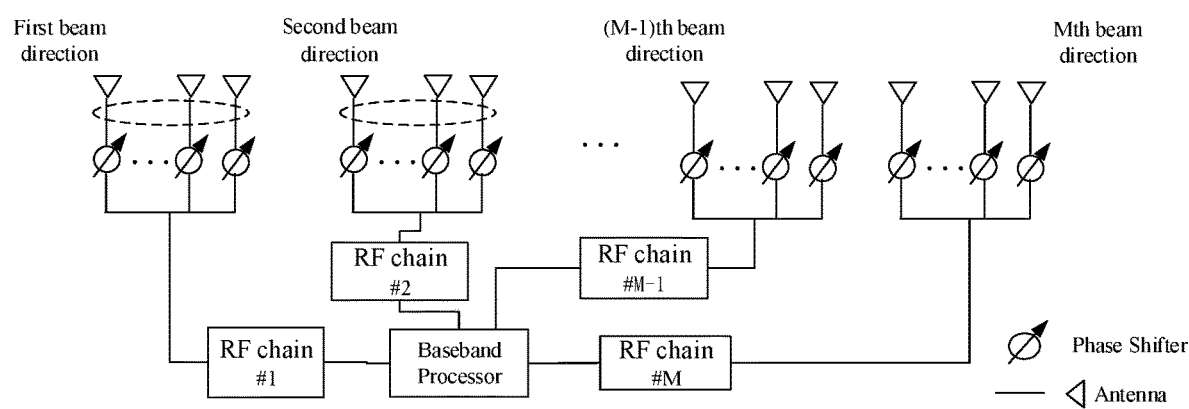
FIG. 10 is a diagram illustrating a communication device based on multiple antennas according to one embodiment of the disclosure.

Embodiment 10 illustrates a diagram of a communication device based on multiple antennas, as shown in FIG. 10.

Figure 11:
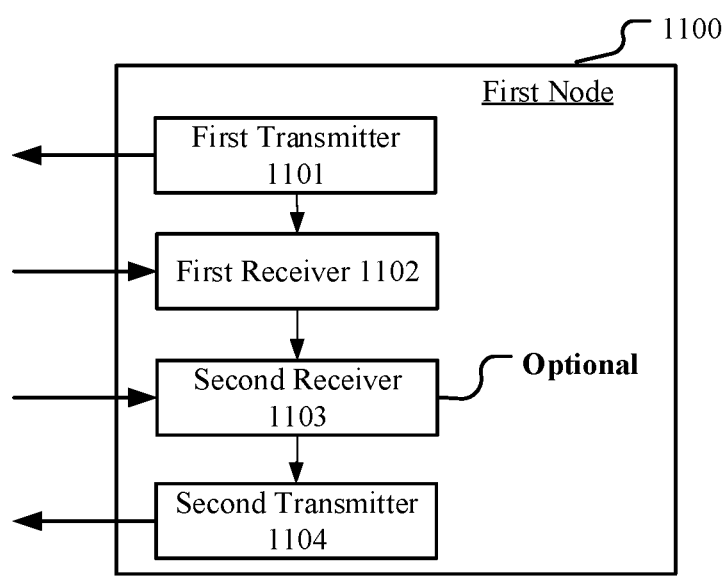
FIG. 11 is a structure block diagram illustrating a processing device in a first node according to one embodiment of the disclosure.

In Embodiment 10, a baseband processor is connected to M Radio Frequency (RF) chains, namely, RF chains #1, #2, . . . , #M-1, #M shown in FIG. 11. The M RF chains form M beam directions respectively, namely, a first beam direction, a second beam direction, . . . , an (M-1)th beam direction and an Mth beam direction.

In one embodiment, one antenna port is formed by antennas in a positive integer number of antenna group(s) through antenna virtualization superposition; one antenna group includes a positive integer number of antenna(s). One antenna group is connected to a baseband processor through one RF chain, and different antenna groups correspond to different RF chains. Mapping coefficients from all antennas in a positive integer number of antenna group(s) included in a given antenna port to the given antenna port constitute a beamforming vector corresponding to the given antenna port. Mapping coefficients from multiple antennas included in any one given antenna group among a positive integer number of antenna group(s) included in the given antenna port to the given antenna port constitute an analog beamforming vector of the given antenna group. Analog beamforming vectors corresponding to the positive integer number of antenna groups are diagonally arranged to form an analog beamforming matrix corresponding to the given antenna port. Mapping coefficients from the positive integer number of antenna groups to the given antenna port constitute a digital beamforming vector corresponding to the given antenna port. The beamforming vector corresponding to the given antenna port is obtained by a product of the analog beamforming matrix and the digital beamforming vector corresponding to the given antenna port.

In one embodiment, the Q1 first-type radio signal(s) is(are) transmitted by Q1 antenna port group(s) respectively, any one of the Q1 antenna port group(s) includes a positive integer number of antenna port(s), different antenna ports in one antenna port group are formed by same antennas, and different antenna ports in one same antenna port group correspond to different beamforming vectors.

In one embodiment, the M beam directions are generated by one same analog beamforming vector, the M beam directions correspond to M antenna ports, and the M antenna ports constitute one of the Q1 antenna port group(s).

In one embodiment, the Q1 first-type radio signal(s) is(are) transmitted by Q1 antenna port(s) respectively.

In one embodiment, the M RF chains correspond to M antenna ports respectively, and one antenna port is formed by one or more antennas connected to the corresponding RF chain through antenna virtualization superposition.

In one embodiment, the M is equal to the Q1 in the disclosure, and the Q1 first-type radio signals in the disclosure are transmitted by the M antenna ports respectively.

In one embodiment, the M RF chains correspond to the M antenna ports respectively, and beam directions corresponding to the M antenna ports are the M beam directions respectively.

In one embodiment, the baseband processor belongs to the first node in the disclosure.

In one embodiment, the baseband processor belongs to the target node in the disclosure.

In one embodiment, the baseband processor belongs to the second node in the disclosure.

In one embodiment, any one of the M beam directions corresponds to an analog beamforming.

In one embodiment, antennas in each RF chain of part of the M RF chains are superposed through a first vector (corresponding to the M beam directions); further, all of the M RF chains are superposed through a second vector, that is, a Kronecker Product of the first vector and the second vector forms the first receiving parameter group.

In one embodiment, antennas in each RF chain of part of the M RF chains are superposed through a first vector (corresponding to the M beam directions); further, all of the M RF chains are superposed through a second vector, that is, a Kronecker Product of the first vector and the second vector forms the second receiving parameter group.

Embodiment 11

Embodiment 11 illustrates a structure block diagram of a processing device in a first node, as shown in FIG. 11. In Embodiment 11, a first node 1100 includes a first transmitter 1101, a first receiver 1102, a second receiver 1103 and a second transmitter 1104, wherein the second receiver 1103 is optional.

In Embodiment 11, the first transmitter 1101 transmits Q1 first-type radio signal(s), the Q1 being a positive integer; the first receiver 1102 receives a first radio signal; the second receiver 1103 receives second information; and the second transmitter 1104 transmits first information.

In Embodiment 11, the Q1 first-type radio signal(s) is(are) transmitted by Q1 spatial parameter group(s) respectively; the first information includes a first ID and Q1 piece(s) of channel information, and the first information is used for indicating Q1 geographic position(s); the Q1 piece(s) of channel information is(are) based on a channel measurement(s) performed by a target node for the Q1 spatial parameter group(s) respectively, and the target node is identified by the first ID; the Q1 spatial parameter group(s) cover(s) the Q1 geographic position(s) respectively; the first radio signal carries the Q1 piece(s) of channel information; and the second information is used for triggering a transmission of the first information.

In one embodiment, each of the Q1 piece(s) of channel information includes an RSRP.

In one embodiment, each of the Q1 piece(s) of channel information includes an RSRQ.

In one embodiment, each of the Q1 piece(s) of channel information includes an AoA.

In one embodiment, each of the Q1 piece(s) of channel information includes a 3 dB beam width.

In one embodiment, the first node 1100 is the second communication node 410 in FIG. 4, and the first transmitter 1101 includes the antenna 420, the transmitter 418 and the transmitting processor 416 in FIG. 4.

In one subembodiment, the first transmitter 1101 includes the multi-antenna transmitting processor 471 and the controller/processor 475 in FIG. 4.

In one embodiment, the first node 1100 is the second communication node 410 in FIG. 4, and the first receiver 1102 includes the antenna 420, the receiver 418 and the receiving processor 470 in FIG. 4.

In one subembodiment, the first receiver 1102 includes the multi-antenna receiving processor 472 and the controller/processor 475 in FIG. 4.

In one embodiment, the first node 1100 is the first communication node 450 in FIG. 4, and the first transmitter 1101 includes the antenna 452, the transmitter 454 and the transmitting processor 468 in FIG. 4.

In one subembodiment, the first transmitter 1101 includes the multi-antenna transmitting processor 457 and the controller/processor 459 in FIG. 4.

In one embodiment, the first node 1100 is the first communication node 450 in FIG. 4, and the first receiver 1102 includes the antenna 452, the receiver 454 and the receiving processor 456 in FIG. 4.

In one subembodiment, the first receiver 1102 includes the multi-antenna receiving processor 458 and the controller/processor 459 in FIG. 4.

In one embodiment, the first node is the base station 300 in FIG. 3, and the second receiver 1103 receives the second information according to the positioning protocol 3006 in FIG. 3.

In one embodiment, the first node is the base station 300 in FIG. 3, and the second transmitter 1104 transmits the first information according to the positioning protocol 3006 in FIG. 3.

Figure 13:
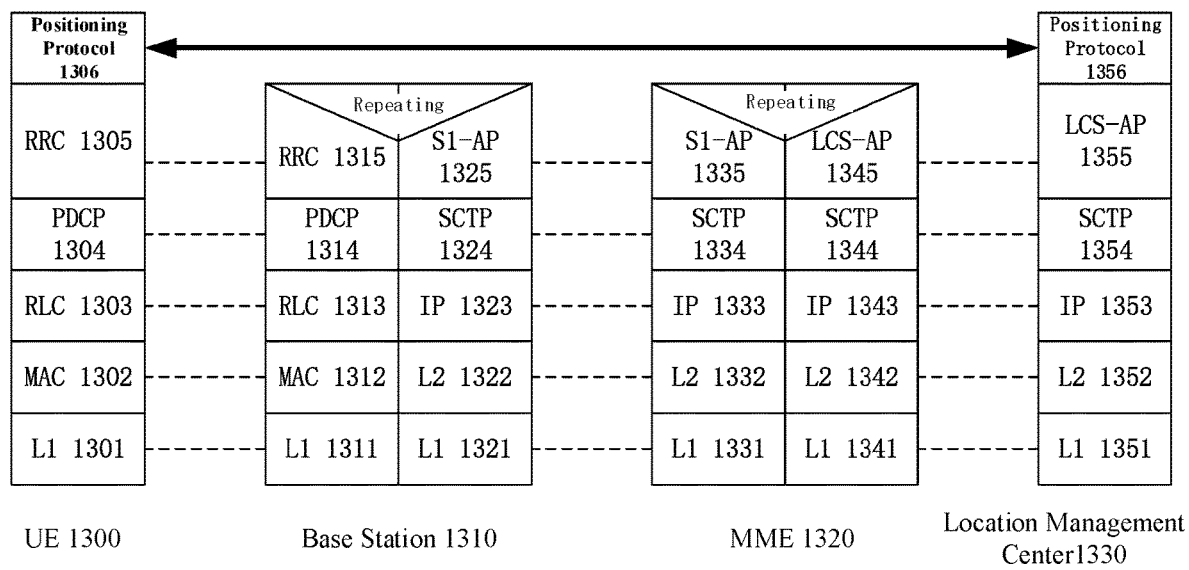
FIG. 13 is a diagram illustrating a protocol architecture between a UE, a base station, a mobility management entity and a location management center according to one embodiment of the disclosure.

In one embodiment, the first node is the UE 1300 in FIG. 13, and the second receiver 1103 receives the second information according to the positioning protocol 1306 in FIG. 13.

In one embodiment, the first node is the base station, UE in FIG. 13, and the second transmitter 1104 transmits the first information according to the positioning protocol 1306 in FIG. 13.

Embodiment 12

Figure 12:
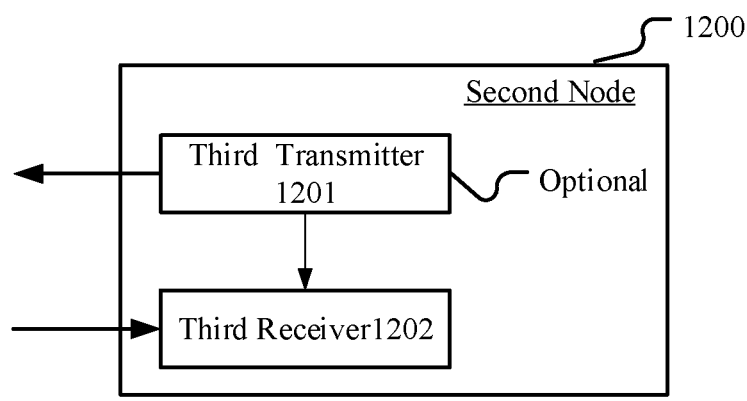
FIG. 12 is a structure block diagram illustrating a processing device in a second node according to one embodiment of the disclosure.

Embodiment 12 illustrates a structure block diagram of a processing device in a second node, as shown in FIG. 12. In Embodiment 12, a second node 1200 includes a third transmitter 1201 and a third receiver 1202, wherein the third transmitter 1201 is optional.

In Embodiment 12, the third transmitter 1201 transmits second information; and the third receiver 1202 receives first information.

In Embodiment 12, the second information is used for triggering a transmission of the first information; the first information includes a first ID and Q1 piece(s) of channel information, and the first information is used for indicating Q1 geographic position(s); the Q1 piece(s) of channel information is(are) based on a channel measurement(s) performed by a target node for Q1 spatial parameter group(s) respectively, and the target node is identified by the first ID; the Q1 spatial parameter group(s) cover(s) the Q1 geographic position(s) respectively; and the Q1 is a positive integer.

In one embodiment, the second node 1200 is the location management center 320 in FIG. 3, and the third receiver 1202 receives the first information according to the positioning protocol 3036 in FIG. 3.

In one embodiment, the second node 1200 is the location management center 320 in FIG. 3, and the third transmitter 1201 transmits the second information according to the positioning protocol 3036 in FIG. 3.

In one embodiment, the second node 1200 is the location management center 1330 in FIG. 13, and the third receiver 1202 receives the first information according to the positioning protocol 1356 in FIG. 13.

In one embodiment, the second node 1200 is the location management center 1330 in FIG. 13, and the third transmitter 1201 transmits the second information according to the positioning protocol 1356 in FIG. 13.

Embodiment 13

Embodiment 13 illustrates a protocol architecture between a UE, a base station, a mobility management entity and a location management center, as shown in FIG. 13.

In FIG. 13, a UE 1300 is connected to a location management center 1330 through a base station 1300 and an MME 1320.

A protocol stack in the UE 1300 includes six layers from the bottom up, which are an L1 1301, an MAC 1302, an RLC 1303, a PDCP 1304, an RRC 1305 and a positioning protocol 1306 respectively.

A protocol stack in the base station 1310 facing the UE 1300 includes five layers from the bottom up, which are an L1 1311, an MAC 1312, an RLC 1313, a PDCP 1314, an RRC 1315 an a positioning protocol 1306 respectively; while a protocol stack facing the MME 1320 includes five layers from the bottom up, which are an L1 1321, an L2 1322, an IP 1323, an SCTP 1324 and an S1-AP 1325 respectively; and the base station 1310 repeats data between the UE 1300 and the MME 1320.

An interface of the MME 1320 facing the base station 1310 includes five layers from the bottom up, which are an L1 1331, an L2 1332, an IP 1333, an SCTP 1334 and an S1-AP 1335 respectively; while an interface facing the location management center 1330 includes five layers from the bottom up, which are an L1 1341, an L2 1342, an IP 1343, an SCTP 1344 and an S1-AP 1345 respectively; the MME 1320 repeats data between the base station 1310 and the location management center 1330.

The location management center 1330 includes six layers from the bottom up, which are an L1 1351, an L2 1352, an IP 1353, an SCTP 1354, an S1-AP 1355 and a positioning protocol 1356 respectively.

In one embodiment, communication between the positioning protocol 1306 and the positioning protocol 1356 is transparent for the MME 1320 and the base station 1310.

In one embodiment, the positioning protocol 1306 and the positioning protocol 1356 are both LTE Positioning Protocol A (LPPa).

In one subembodiment, the first node in the disclosure is the UE 1300, and the second node in the disclosure is the location management center 1330, that is, E-SMLC.

In one embodiment, the positioning protocol 1306 and the positioning protocol 1356 are both New Radio Positioning Protocol A (NRPPa).

In one subembodiment, the first node in the disclosure is the UE 1300, and the second node in the disclosure is the location management center 1330, that is, LWF.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE or terminal in the disclosure includes but not limited to mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, access points, relay base station and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first node for positioning, comprising:
   transmitting Q1 first-type radio signals, the Q1 being a positive integer and greater than 1; and
   transmitting first information;
   wherein the Q1 first-type radio signals are transmitted by Q1 spatial parameter groups respectively; the first information comprises a first Identifier (ID) and Q1 pieces of channel information, and the first information is used for indicating Q1 geographic positions; the Q1 pieces of channel information are based on channel measurements performed by a target node for the Q1 spatial parameter groups respectively, and the target node is identified by the first ID; and the Q1 spatial parameter groups cover the Q1 geographic positions respectively; the first node is a base station, and the Q1 first-type radio signals are all Positioning Reference Signals; the Q1 spatial parameter groups are Q1 antenna port groups respectively and each of the Q1 antenna port groups includes a positive integer number of antenna ports, or, the Q1 spatial parameter groups include Q1 beamforming vectors respectively, the Q1 beamforming vectors are used for forming Q1 beams respectively, and the Q1 beams are used for transmitting the Q1 first-type radio signals respectively.

2. The method according to claim 1, comprising:
   receiving a first radio signal;
   wherein the first radio signal carries the Q1 pieces of channel information.

3. The method according to claim 1, wherein the first information comprises Q1 cell portion IDs, and the Q1 cell portion IDs areused for identifying the Q1 geographic positions respectively.

4. The method according to any one of claim 1, wherein the first information comprises Q1 node IDs, and the Q1 node IDs are used for identifying the Q1 geographic positions respectively.

5. The method according to claim 3, wherein beam centers corresponding to the Q1 spatial parameter groups correspond to the Q1 geographic positions respectively; or, beam centers of analog beams corresponding to the Q1 spatial parameter groups correspond to the Q1 geographic positions respectively.

6. The method according to claim 4, comprising:
   receiving Q1 second-type radio signals;
   wherein the Q1 second-type radio signals are transmitted by Q1 communication nodes respectively, the Q1 node IDs indicate the Q1 communication nodes respectively, and measurements for the Q1 second-type radio signals are used for generating the Q1 spatial parameter groups respectively.

7. The method according to any one of claim 1, comprising:
   receiving second information;
   wherein the second information is used for triggering a transmission of the first information.

8. A method in a second node for positioning, comprising:
   receiving first information;
   wherein the first information comprises a first Identifier (ID) and Q1 pieces of channel information, and the first information is used for indicating Q1 geographic positions; the Q1 pieces of channel information are based on channel measurements performed by a target node for Q1 spatial parameter groups respectively, and the target node is identified by the first ID; the Q1 spatial parameter groups cover the Q1 geographic positions respectively; and the Q1 is a positive integer and greater than 1; a transmitter of the first information is a base station, and the Q1 first-type radio signals are all Positioning Reference Signals; the Q1 spatial parameter groups are Q1 antenna port groups respectively and each of the Q1 antenna port groups includes a positive integer number of antenna ports, or, the Q1 spatial parameter groups include Q1 beamforming vectors respectively, the Q1 beamforming vectors are used for forming Q1 beams respectively, and the Q1 beams are used for transmitting the Q1 first-type radio signals respectively.

9. The method according to claim 8, wherein the first information comprises Q1 node IDs, and the Q1 node IDs are used for identifying the Q1 geographic positions respectively; measurements for Q1 second-type radio signals are used for generating the Q1 spatial parameter groups respectively, the Q1 second-type radio signals are transmitted by Q1 communication nodes respectively, the Q1 node IDs indicate the Q1 communication nodes respectively.

10. The method according to claim 8, comprising:
transmitting second information;
wherein the second information is used for triggering a transmission of the first information.

11. A first node for positioning, comprising:
a first transmitter, to transmit Q1 first-type radio signals, the Q1 being a positive integer and greater than 1; and
a second transmitter, to transmit first information;
wherein the Q1 first-type radio signals are transmitted by Q1 spatial parameter groups respectively; the first information comprises a first Identifier (ID) and Q1 pieces of channel information, and the first information is used for indicating Q1 geographic positions; the Q1 pieces of channel information are based on channel measurements performed by a target node for the Q1 spatial parameter groups respectively, and the target node is identified by the first ID; and the Q1 spatial parameter groups cover the Q1 geographic positions respectively; the first node is a base station, and the Q1 first-type radio signals are all Positioning Reference Signals; the Q1 spatial parameter groups are Q1 antenna port groups respectively and each of the Q1 antenna port groups includes a positive integer number of antenna ports, or, the Q1 spatial parameter groups include Q1 beamforming vectors respectively, the Q1 beamforming vectors are used for forming Q1 beams respectively, and the Q1 beams are used for transmitting the Q1 first-type radio signals respectively.

12. The first node according to claim 11, comprising:
a first receiver, to receive a first radio signal;
wherein the first radio signal carries the Q1 pieces of channel information.

13. The first node according to claim 11, comprising:
a second receiver, to receive second information;
wherein the second information is used for triggering a transmission of the first information.

14. The first node according to claim 11, wherein the first information comprises Q1 cell portion IDs, and the Q1 cell portion IDs are used for identifying the Q1 geographic positions respectively.

15. The first node according to any one of claim 11, wherein the first information comprises Q1 node IDs, and the Q1 node IDs are used for identifying the Q1 geographic positions respectively.

16. The first node according to claim 14, wherein beam centers corresponding to the Q1 spatial parameter groups correspond to the Q1 geographic positions respectively; or, beam centers of analog beams corresponding to the Q1 spatial parameter groups correspond to the Q1 geographic positions respectively.

17. The first node according to claim 15, wherein the first receiver receives Q1 second-type radio signals;
wherein the Q1 second-type radio signals are transmitted by Q1 communication nodes respectively, the Q1 node IDs indicate the Q1 communication nodes respectively, and measurements for the Q1 second-type radio signals are used for generating the Q1 spatial parameter groups respectively.

18. A second node for positioning, comprising:
a third receiver, to receive first information;
wherein the first information comprises a first Identifier (ID) and Q1 pieces of channel information, and the first information is used for indicating Q1 geographic positions; the Q1 pieces of channel information are based on channel measurements performed by a target node for Q1 spatial parameter groups respectively, and the target node is identified by the first ID; the Q1 spatial parameter groups cover the Q1 geographic positions respectively; and the Q1 is a positive integer and greater than 1; a transmitter of the first information is a base station, and the Q1 first-type radio signals are all Positioning Reference Signals; the Q1 spatial Parameter groups are Q1 antenna port groups respectively and each of the Q1 antenna port groups includes a positive integer number of antenna ports, or, the Q1 spatial parameter groups include Q1 beamforming vectors respectively, the Q1 beamforming vectors are used for forming Q1 beams respectively, and the Q1 beams are used for transmitting the Q1 first-type radio signals respectively.

19. The second node according to claim 18, comprising:
a third transmitter, to transmit second information;
wherein the second information is used for triggering a transmission of the first information.

20. The second node according to claim 18, wherein the first information comprises Q1 node IDs, and the Q1 node IDs are used for identifying the Q1 geographic positions respectively; measurements for Q1 second-type radio signals are used for generating the Q1 spatial parameter groups respectively, the Q1 second-type radio signals are transmitted by Q1 communication nodes respectively, the Q1 node IDs indicate the Q1 communication nodes respectively.

\* \* \* \* \*